E. E. LINDSEY.
SECTIONAL BAKING OVEN.
APPLICATION FILED MAY 12, 1919.

1,391,259.

Patented Sept. 20, 1921.
2 SHEETS—SHEET 1.

Inventor
Ernest E. Lindsey
By Arthur L. Slee
Atty.

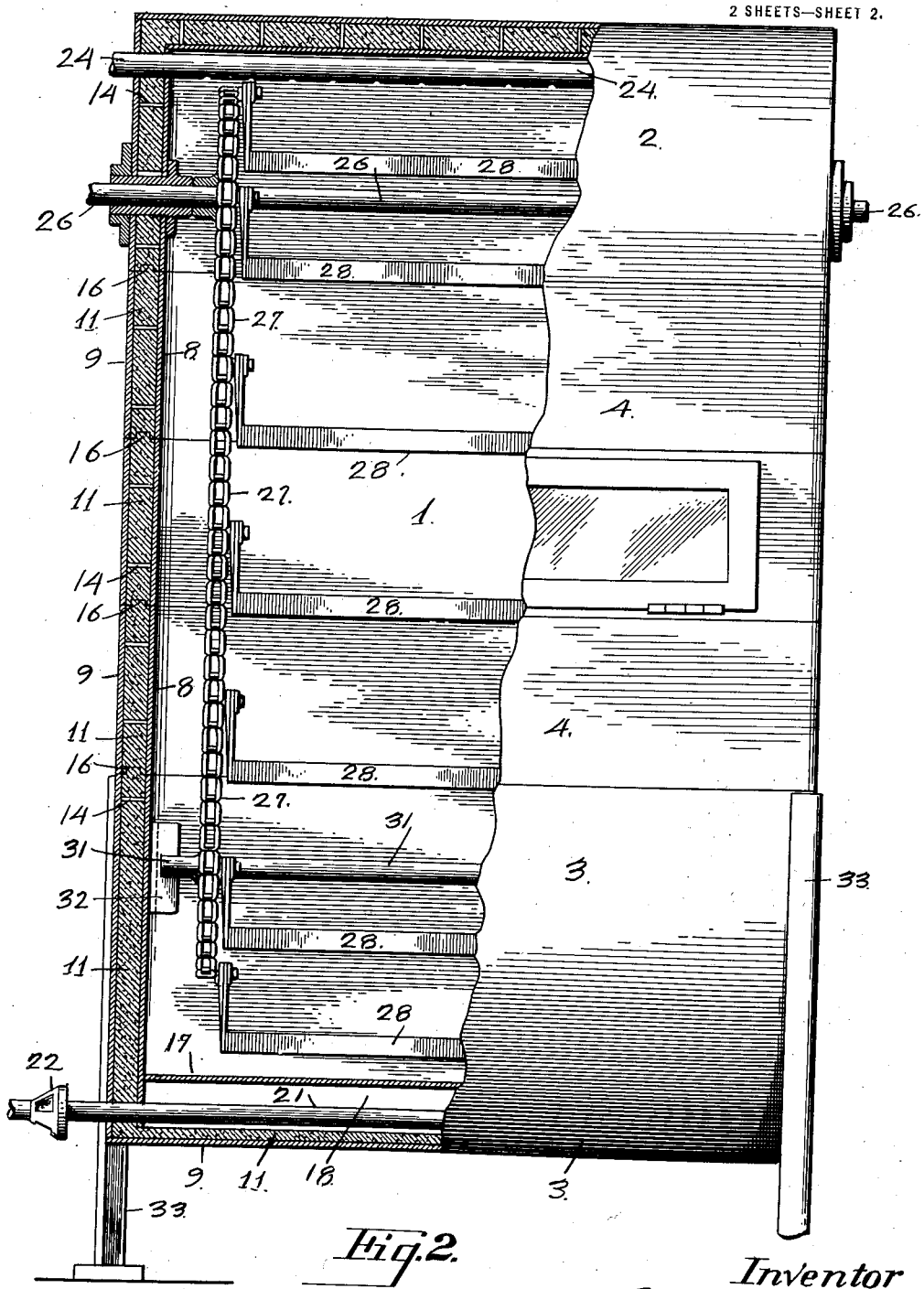

UNITED STATES PATENT OFFICE.

ERNEST E. LINDSEY, OF SAN FRANCISCO, CALIFORNIA, ASSIGNOR TO BAKE-RITE OVEN MANUFACTURING COMPANY, A CORPORATION OF NEVADA.

SECTIONAL BAKING-OVEN.

1,391,259. Specification of Letters Patent. Patented Sept. 20, 1921.

Continuation of application Serial No. 227,597, filed April 9, 1918. This application filed May 12, 1919. Serial No. 296,638.

*To all whom it may concern:*

Be it known that I, ERNEST E. LINDSEY, a citizen of the United States, residing in the city and county of San Francisco and State of California, have invented a certain new and useful Improvement in a Sectional Baking-Oven, of which the following is a specification.

My invention relates to improvements in baking ovens wherein a plurality of sections operate to produce improved baking ovens of various sizes and capacities and is a continuation of my abandoned application #227,597, filed April 9th, 1918.

The primary object of the present invention is to provide an improved sectional oven.

It is also an object to provide an improved sectional oven of the character described having means for insulating the same to minimize the loss of heat by radiation.

A further object of my invention is to provide an improved construction for baking ovens and the like wherein ovens of various sizes and capacities may be easily and readily provided at a minimum cost.

A still further object of the invention is to provide an improved oven having means for preventing the exposure of the produce being baked to the products of combustion.

Another object is to provide an improved oven having adjustable means for uniformly heating the product to be baked.

It is also provided in this invention, that steam shall be introduced into the oven for tempering the product being baked. Another important and novel feature of my invention is the production of a baking oven arranged to provide a maximum capacity with a minimum floor space.

I accomplish these and other objects by means of the device disclosed in the drawings forming a part of the present specification wherein like characters of reference are used to designate similar parts throughout the specification and drawings, and in which:

Fig. 2 is a broken side elevation of my improved oven, partly in section.

Figure 1:
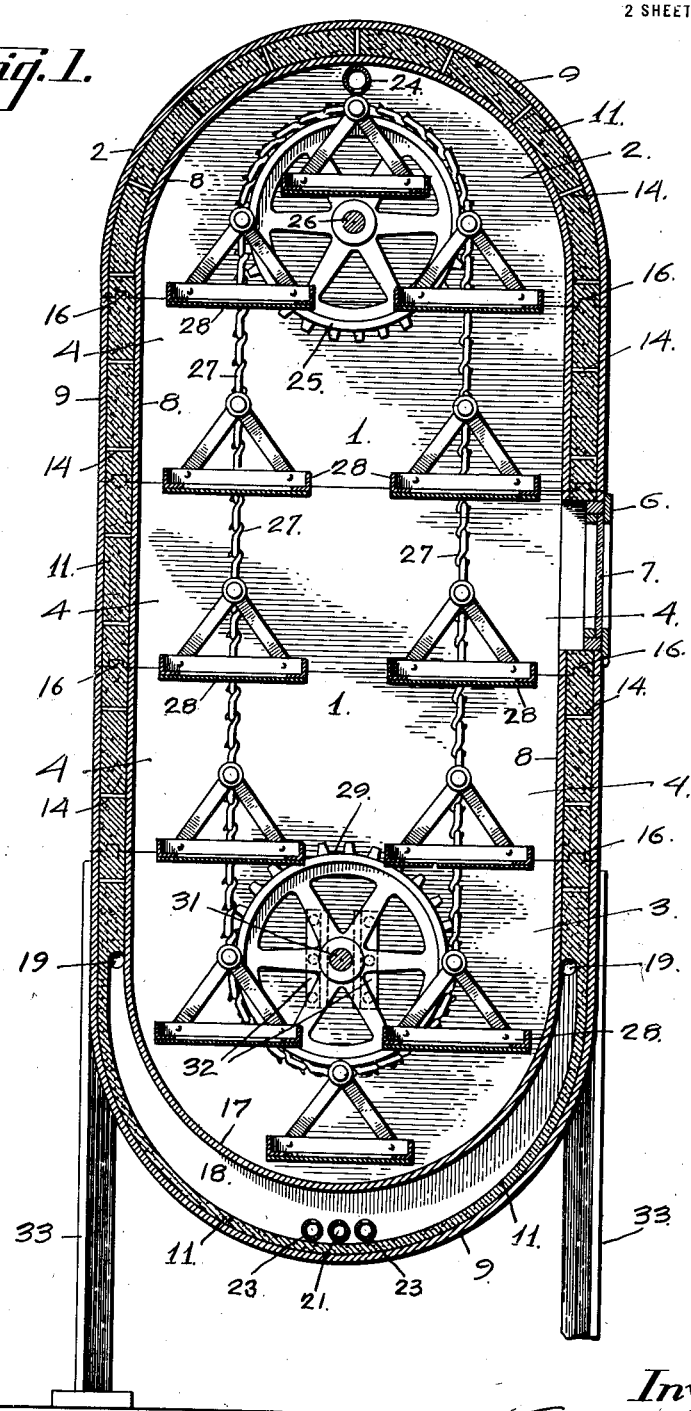
Figure 1 is a transverse vertical sectional view of the oven.

Referring to the drawings the numeral 1 is used to designate in general a baking oven consisting of arcuate top and bottom sections 2 and 3 respectively and substantially rectangular intermediate sections 4 connected between said top and bottom sections 2 and 3.

One of the intermediate sections 4 is provided with a suitable door 6 to provide access to the interior of the oven 1, said door 6 having a window 7 therein for observation purposes.

All of the sections 2, 3 and 4 consist of inner and outer shells 8 and 9 respectively, which may be of sheet metal or any other suitable material, and the space between said shells 8 and 9 is filled with a suitable heat insulating material 11, which may be in the form of bricks or any other suitable form.

The inner and outer shells 8 and 9, respectively, are secured together by means of suitable stay bolts 14 and all of the sections 2, 3 and 4 are provided at their adjoining edges with tongue and groove as disclosed at 16 in order to facilitate and retain alinement and connection of said sections.

The inner shell of the bottom section 3 serves as a heat radiating element 17 arranged to inclose an arcuate combustion chamber 18 formed between said inner shell and the insulating material 11 secured against the outer arcuate shell 9, whereby the combustion chamber 18 becomes an integral part of the bottom section 3. Combustion is confined to the relatively small chamber 18 and the heat resulting from combustion is distributed evenly over the entire area of the arcuate member 17. Vents 19 are provided for removing the products of combustion to prevent exposure of the product to be baked to the combusted gases.

The heating plate 17 is heated by means of a perforated gas pipe 21 which extends longitudinally within the combustion chamber as disclosed in Fig. 2 of the drawings, and is provided exteriorly of the oven 1 with a suitable air regulating device or damper 22.

To facilitate combustion of gas or other fuel carried into the combustion chamber 18 by the pipe 21 I have provided two perforated air pipes 23 arranged parallel with the gas or fuel pipe 21 to conduct air in sufficient quantities into said chamber 18.

Longitudinally arranged within the upper portion of the top section 2 I have provided a longitudinally disposed perforated steam pipe 24 through which steam may be injected into the interior of the oven 1 for the purpose of tempering the product being baked.

A longitudinal shaft 26 is rotatably mounted within the upper portion of the top section 2 and is provided with sprockets 25 from which chains 27 are suspended. The chains 27 are likewise provided with pivotally suspended trays 28 of suitable shape and construction to support the product being baked.

Sprockets 29, mounted upon a second shaft 31, are suspended and supported by the chains 27, the ends of said shaft 31 being movably mounted between guide plates 32 secured to the interior ends of the oven 1 whereby lateral movement of the lower portion of the entire endless conveyer is prevented while a vertical longitudinal movement, due to expansion and contraction of the chains 27 caused by changes of temperature within the oven, is permitted.

Rotation of the shaft 26, by means of any suitable energy, moves the conveyer and product to be baked, which is supported by the trays 28, over the heat radiating element or plate 17 along an arcuate path adjacent and parallel to the heated surface, thereby increasing the period during which the product to be baked is exposed to the maximum heat radiated from the element 17.

Steam may be admitted to the oven 1 through the pipe 24 to temper the product while baking.

It is obvious that the amount of heat may be readily and easily regulated by any suitable valve, not shown, which may be placed on the fuel pipe 21.

The entire oven 1 may be supported a suitable distance above the floor by means of suitable legs or standards 33.

It is obvious that any number of intermediate sections 4 may be provided to increase the capacity of the oven 1, or removed to reduce the size and capacity of the oven.

It is also evident that the number of sections 4 which may be added to increase the capacity of the oven 1 is only limited by the height of the compartment or room within which the oven is located.

Any number of sections, compatible with the strength of the lower supporting sections, may be added thereby increasing the capacity with a minimum floor space.

As the trays 28 may be filled through the door 6 at a convenient height from the floor it is evident that the trays of an oven of any height may be filled regardless of the height of said oven by the simple expedient of slowly rotating the endless conveyer comprising the sprockets 25 and chains 27, thereby causing said trays 28 to pass the door 6.

I am aware that the present state of the art discloses ovens having endless conveyers therein for moving a product within said oven. I therefore do not wish to claim such a combination broadly as my invention, but what I do claim is—

1. A sectional baking oven comprising arcuate top and bottom sections; intermediate sections arranged to be connected between said top and bottom sections; a combustion chamber formed within the bottom section and arranged to heat the inner arcuate surface thereat; and means for continuously moving a product to be baked along a path adjacent to said heated arcuate surface.

2. A sectional baking oven comprising arcuate top and bottom sections; intermediate sections arranged to be connected between said top and bottom sections; an arcuate heat radiating shell forming the inner wall of the bottom section; an arcuate combustion chamber formed within said bottom section to heat said heat radiating shell; and means for moving a product to be baked along a path adjacent said heat radiating shell.

3. A sectional baking oven comprising arcuate top and bottom sections; intermediate sections arranged to be connected between said top and bottom sections; an arcuate heat radiating shell forming the inner wall of the bottom section; an arcuate combustion chamber formed within said bottom section to heat said heat radiating shell; and means for moving a product to be baked along a path adjacent and parallel to said heat radiating shell.

4. In a sectional baking oven, a bottom arcuate section comprising inner and outer arcuate shells; heat insulating material secured between said shells; a combustion chamber formed adjacent the inner arcuate shell for heating said shell to radiate heat into the oven; a plurality of sections comprising inner and outer shells inclosing heat insulating material arranged to be superimposed upon the bottom section; an arcuate top section arranged to be superimposed upon the upper intermediate section; and means for continuously moving a product to be baked along an arcuate path adjacent to the heated inner shell of the bottom section.

5. In a sectional baking oven, a bottom arcuate section comprising inner and outer arcuate shells; heat insulating material secured between said shells; a combustion chamber formed adjacent the inner arcuate shell for heating said shell to radiate heat into the oven; a plurality of sections comprising inner and outer shells inclosing heat insulating material arranged to be superimposed upon the bottom section; an arcuate top section arranged to be superimposed upon the upper intermediate section; and means for continuously moving a product to be baked along an arcuate path adjacent and parallel to the heat radiating portion of the inner arcuate shell of the bottom section.

In witness whereof I hereunto set my signature.

ERNEST E. LINDSEY.